(No Model.)
J. GILBERT.
GAS GENERATING FURNACE.
No. 397,907. Patented Feb. 19, 1889.
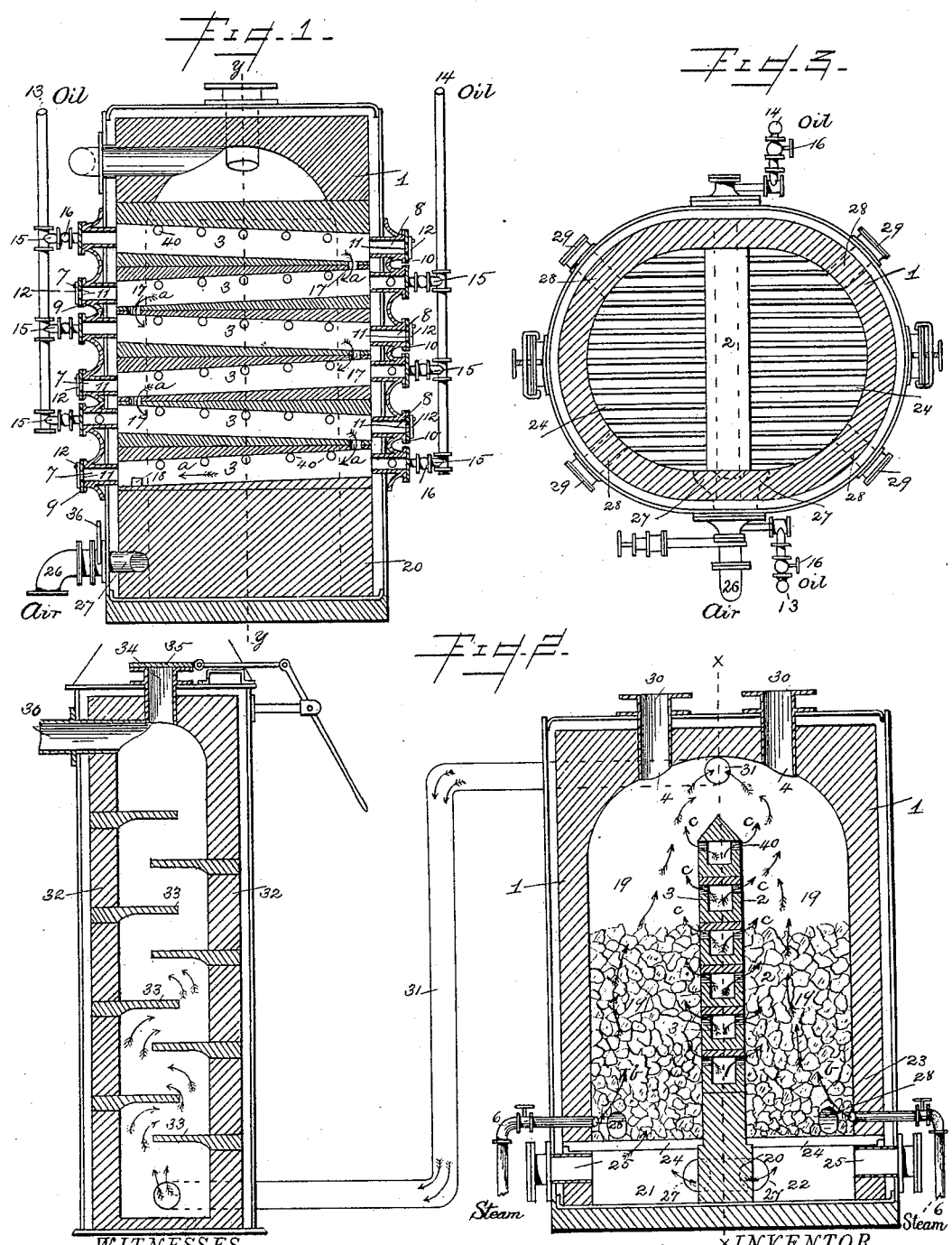
WITNESSES.
Jos. H. Blackwood
F. P. Davis.
INVENTOR.
James Gilbert
per R. S. Du Bois
his Attorney.

United States Patent Office.

JAMES GILBERT, OF OMAHA, NEBRASKA, ASSIGNOR OF ONE-HALF TO CHARLES E. LEE, OF SAME PLACE.

GAS-GENERATING FURNACE.

SPECIFICATION forming part of Letters Patent No. 397,907, dated February 19, 1889.

Application filed March 13, 1888. Serial No. 267,083. (No model.)

*To all whom it may concern:*

Be it known that I, JAMES GILBERT, a citizen of the United States, residing at Omaha, in the county of Douglas and State of Nebraska, have invented certain new and useful Improvements in Gas-Generating Furnaces; and I do hereby declare the following to be a full, clear, and exact description of the invention, such as will enable others skilled in the art to which it appertains to make use the same.

My invention relates to an apparatus for manufacturing illuminating and heating gas in which steam is decomposed by passing it through incandescent fuel in a cupola-furnace, and wherein hydrocarbon oil is vaporized and mixed with the hydrogen gas in the same chamber, and the mixed carbureted gases conducted to a separate chamber, where they are converted into a fixed homogeneous gas.

In the devices which have hitherto been employed for this purpose it has been common to use one or more retorts arranged with drip-shelves forming chambers alternately communicating with each other, whereby the oil or hydrocarbon is made to pursue a tortuous downward course and in which the gases generated have passed upwardly through the retort and out at the top. In these retorts the oil-supply pipes have been so arranged as to introduce the oil only at the top of the retort above the series of shelves, and the fire-grate and fuel have been located upon one side only of the series of shelves, permitting only one side of the retort to come directly in contact with the fuel and its products of combustion.

The object of my invention is to produce a furnace with its retorts so arranged therein as to be equally heated on both sides, in combination with oil-supply pipes so arranged that the oil can be introduced at various points along the series of inclined retorts, whereby the supply thereto can be regulated to vaporize the oil and carburet the hydrogen gas in the most economical and rapid manner.

With these ends in view my invention consists in the peculiar mechanism and combination of parts more fully described hereinafter, and pointed out in the claims.

Referring to the accompanying drawings, Figure 1 represents a side elevation in cross-section through lines $x\,x$ of Fig. 2, which latter shows my complete invention, also in cross-section through lines $y\,y$ of Fig. 1; and Fig. 3 represents a plan in cross-section of the generating chamber or furnace.

The reference-figure 1 indicates a gas-generating cupola-furnace having an oval shape and provided with a central partition, 2, extending across its shorter diameter. Located in this partition are a number of retorts, 3, arranged one above the other in vertical series, and each sloping in a direction opposite to that of the adjoining or contiguous one, as shown more clearly in Fig. 1. These retorts are preferably rectangular, as shown in Fig. 2, and in order to make them accessible for the purpose of cleaning, observation, or in some instances to replenish them with solid carbonaceous substances the opposite ends of each are provided with entrance-pipes 7 and 8, extending out a short distance from the outer face of the furnace and provided with removable caps or covers 9 and 10. The covers 9 and 10 upon the lower ends of the retorts are provided with observation-ports 11, covered by suitable doors, 12, which are kept normally closed. By this means the interior of the retorts can be examined without removing the larger caps, 9 and 10. Oil is introduced into each retort by means of the main supply-pipes 13 and 14, located upon opposite sides of the furnace and provided with short branch pipes 15, containing valves 16. Each retort is provided with a series of openings, 40, for the escape of the hydrocarbon vapors. The retorts are made to communicate with each other by openings 17, which extend through the bottom of the lower end of one retort into the top of the upper end of the next retort below. This arrangement compels the oil to pursue a gradual zigzag course throughout the retorts while it is undergoing vaporization by the intense heat of the incandescent fuel. The flow of the oil is indicated by the arrows $a$. The lowest retort of the series is provided with an opening, 18, which allows any possible residuum to escape into the fire-chamber 19. The base 20 of the partition serves to separate the ash-pit into two compartments, each of which is provided with openings 25 and an air-blast pipe, 26, located at one end of the partition-base. The fuel 23 is supported upon a pair of grates, 24, located upon opposite sides of the partition 2. The main blast-pipe 26 supplies air to both blast-pipes 27. The size of these pipes 26 is such as to supply an equal amount of air to both bodies of fuel on opposite sides of the partition. Clinker-openings 28 are made through the furnace-walls above the grate 24 to enable the fire-chambers 19 to be cleared when necessary. These openings are provided with the usual gas-pipe caps, 29.

Fuel is supplied to the furnace through the openings 4, provided with sealing-caps in the top of the generating-chamber. A flue, 31, connects the upper part of the generating or fire chamber 19 with lower part of the fixer 32, through which flue the mixed gases from said chamber are conveyed to the lower part of the fixer. The flow of the gas up through the superheater is made tortuous by a series of laterally-extending shelves, 33, arranged in such a manner as to form chambers alternately communicating with each other. Steam is introduced directly into the fuel by the valve-pipes or nozzles 6, which pass through the walls of the furnace and into the lower part of the chambers 19.

The top of the fixer is of well-known construction, being provided with an opening, 34, having a valve, 35. The pipe 36, leading out from the superheater, conveys the gas to any suitable scrubber or purifier. Aside from the novel features already described, the furnace and its auxiliaries may be built in any well-known or approved manner.

The retorts can, by means of their open ends and removable caps, be provided with solid carbonaceous substances for the purpose of enriching the hydrogen gas; but they are more especially adapted for liquid hydrocarbon, which I prefer to use.

Having thus described the preferred construction of my invention, I will now proceed to set forth the manner in which it can be successfully operated.

After having blown the fuel to incandescence by a blast of air through the blast-pipes 26 while the furnace is open in the usual manner, the furnace is then sealed and the liquid hydrocarbon or oil admitted to the retorts through the supply and branch pipes 13, 14, and 15. The lower valves of the branch pipes may be kept closed, while the oil enters at the upper end of the highest retort through branch pipe 15. It then flows slowly down the inclined surface of the first retort to the opening 17 in the bottom of its lower end, and if not vaporized by the time it reaches this opening it will fall into the upper end of the retort located just below, and, entering this second retort, it will flow in a direction opposite to that of the one through which it has just passed, and so on until it has reached the fire at the outlet 18, or until it has become entirely vaporized by the heat of the incandescent fuel. While the oil is thus being converted into vapor, steam is admitted into or through the incandescent fuel from the steam-pipes 6, as indicated by the arrows $b$. After the hydrogen has passed through the incandescent fuel, it unites with and is enriched by the hydrocarbon vapors $c$, proceeding out of the retorts through the openings 40, both of the gases uniting in the upper part of the generating-chamber, whence they pass into the fixer 32 $via$ pipe or flue 31.

The process thus briefly set forth, being well known in the art, will not require further description.

In order to hasten the entrance of the oil, a slight stream may be admitted through all the branch supply-pipes 15 at once, which operation saves the time usually consumed in waiting for it to travel through a whole series of retorts, and as the furnace begins to cool and gradually becomes less capable of vaporizing the oil the lower valves in the branch pipes can be turned off, so that a small amount of oil will be slowly admitted into the highest retort. By this arrangement the hydrogen gas can be carbureted to any desired degree with great facility.

Having thus described my invention, what I claim as new, and desire to secure by Letters Patent, is—

1. The combination, in a gas-generating furnace, of a central partition having fire-grates upon its opposite sides, a series of inclined retorts being made to communicate with each other and each being provided with a separate oil-supply pipe at its upper end, a gas-tight cover at its opposite end and having orifices extending into the furnace-chamber along their upper parts, a valve located in each of said oil-supply pipes, an air-blast located below said grates, outlet-pipes located at the top of the furnace, and the valves for sealing the furnace, all arranged and adapted to operate substantially as described.

2. The herein-described gas-generating furnace having a central partition provided with inclined retorts communicating with each other, each retort having a separate oil-supply pipe at its upper end and a gas-tight cover at its lower end, and a series of openings leading into the furnace-chamber along the upper part, in the manner and for the purpose substantially as described.

In testimony whereof I affix my signature in presence of two witnesses.

JAMES GILBERT.

Witnesses:
F. D. MUIR,
A. E. DUNCAN.